J. P. KEFAUVER.
SEED-PLANTER.

No. 182,451. Patented Sept. 19, 1876.

Witnesses:
Wm Bertrand Acker
J. Monroe McNeill

Inventor:
Jacob P. Kefauver
per Parker H. Sweet Jr. & Co.
Attys

UNITED STATES PATENT OFFICE.

JACOB P. KEFAUVER, OF MADISONVILLE, TENNESSEE.

IMPROVEMENT IN SEED-PLANTERS.

Specification forming part of Letters Patent No. 182,451, dated September 19, 1876; application filed July 17, 1876.

*To all whom it may concern:*

Be it known that I, JACOB P. KEFAUVER, of Madisonville, in the county of Monroe and State of Tennessee, have invented certain new and useful Improvements in Seed-Planters; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to an improved construction of seed-planters, in which the seed-dropping mechanism is operated by one of the handles of the planter, in place of the wheel usually employed for such purposes; and it consists of the details of construction and arrangement of parts, all as will be hereinafter more fully described, and pointed out in the claims.

Figure 1:
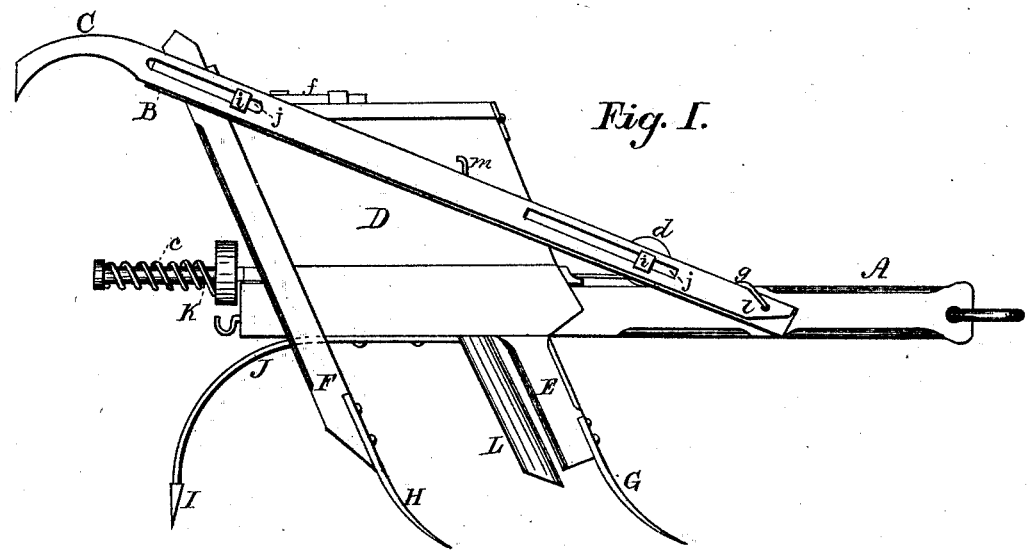
Figure 2:
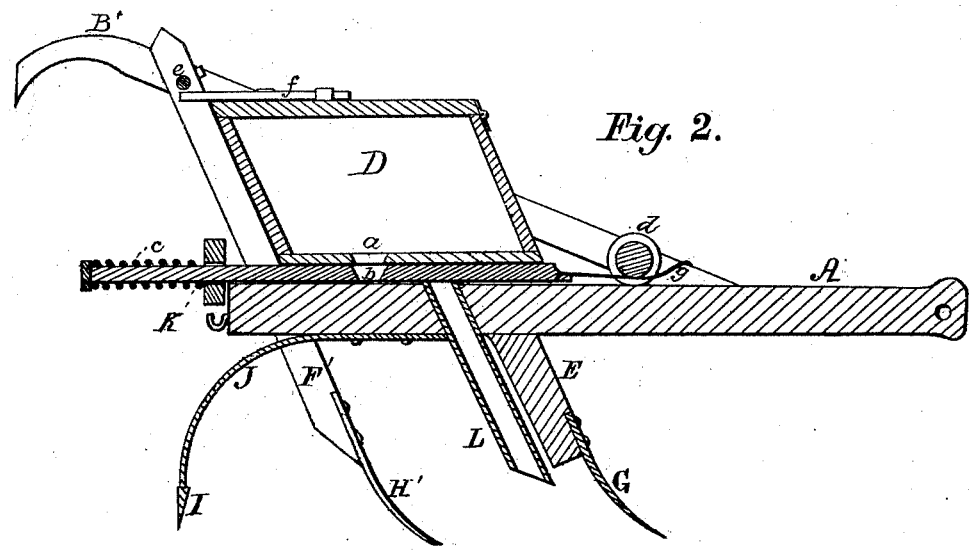

Referring to the drawings, Figure 1 represents a side elevation of a seed-planter embodying my improvements. Fig. 2 is a vertical longitudinal section of the same.

Similar letters of reference occurring on the several figures indicate like parts.

A represents the draft-pole, having the stationary handles B B' and movable handle C attached thereto, said movable handle being attached to the stationary handle B by means of bolts $i$ working in slots $j$, as shown in Fig. 1, so as to allow of the handle C being readily pushed forward or drawn backward, as occasion may require. At the rear upper part of the draft-pole is situated the seed-hopper D, which is provided with an opening, $a$, in its bottom to allow of a given quantity of seed to drop into the cell $b$ in the seed-slide K, situated under the bottom of the hopper.

E represents the front, and F F' the rear inclined bars, to the bottom of the first of which is secured the furrow-opener G, while to the latter are attached the furrow-coverers H H', a shovel, I, being also situated in the rear, and attached to the spring-bar J to more effectually cover the seed when planted.

The seed-slide K is provided with a spring, $c$, at the rear, and with a cord or chain, $g$, at the front, which, passing under a friction-roller, $d$, is secured to the front end of the sliding handle C. This cord or chain may, however, be secured either at the front of the sliding handle C, as shown at $l$, or at the center of the handle, as shown at $m$, as may be desired, the only difference being that, when secured at the front, the handle has to be pushed forward to operate the seed-slide, and when secured at the center, at $m$, the handle has to be drawn back to accomplish a like result.

In the operation of my improved invention the hopper D is filled with the grain or seed desired to be planted, and, as the machine is propelled forward, the operator pushes forward the sliding handle C, if the chain $g$ is secured to the front end, which operation moves the seed-slide K, carrying the seed in the cell $b$ until it is discharged into the spout L, and from thence into the furrow, where it is covered up. The spring $c$ now draws the slide K back to its former position, filling the cell $b$ with a fresh supply of seed, allowing the planting to be repeated at regular intervals and at suitable distances apart, at the will of the operator.

It may be remarked that the upper ends of the inclined bars F F' are provided with a cross-bar, $e$, the ends of which are secured in the stationary handles B B', and the end of the bolt $f$ on the lid of the hopper D, passing under this cross-arm, secures the lid in place.

Having thus described my invention, I claim as new and useful—

In a seed-planter, the combination of hopper D, handles B B', and seed-slide K, having a spring, $c$, at the rear, and cord or chain $g$ at the front, friction-roller $d$, and sliding handle C, substantially as and for the purpose described.

In testimony that I claim the foregoing as my own invention, I affix my signature in presence of two witnesses.

JACOB P. KEFAUVER.

Witnesses:
J. C. MONTGOMERY,
T. E. H. McCROSKEY.